United States Patent
Boswell et al.

(10) Patent No.: US 9,352,412 B2
(45) Date of Patent: May 31, 2016

(54) METHOD OF FORMING A BONDED ASSEMBLY

(71) Applicant: ROLLS-ROYCE PLC, London (GB)

(72) Inventors: John Harold Boswell, Derby (GB); Daniel Clark, Belper (GB); Charles Richard Carpenter, Leicester (GB); Andrew Richard Kennedy, Nottingham (GB)

(73) Assignee: ROLLS-ROYCE plc, London (GB)

( * ) Notice: Subject to any disclaimer, the term of this patent is extended or adjusted under 35 U.S.C. 154(b) by 393 days.

(21) Appl. No.: 14/156,923

(22) Filed: Jan. 16, 2014

(65) Prior Publication Data

US 2014/0220377 A1 Aug. 7, 2014

(30) Foreign Application Priority Data

Feb. 6, 2013 (GB) .................................. 1302060.7

(51) Int. Cl.
| | |
|---|---|
| *B23K 15/00* | (2006.01) |
| *B23K 26/21* | (2014.01) |
| *B23K 26/346* | (2014.01) |
| *B23K 28/02* | (2014.01) |

(Continued)

(52) U.S. Cl.
CPC ......... *B23K 15/0006* (2013.01); *B23K 15/0046* (2013.01); *B23K 15/06* (2013.01); *B23K 20/021* (2013.01); *B23K 26/203* (2013.01); *B23K 26/21* (2015.10); *B23K 26/211* (2015.10); *B23K 26/346* (2015.10); *B23K 28/02* (2013.01); *B32B 15/01* (2013.01); *Y10T 428/12493* (2015.01)

(58) Field of Classification Search
CPC ........... B23K 15/0006; B23K 15/0046; B23K 15/00; B23K 26/21; B23K 26/346; B23K 28/02; B32B 15/01
USPC ............. 219/121.13, 121.14, 121.63, 121.64; 228/175, 193, 196; 428/34.1, 544, 577, 428/615
See application file for complete search history.

(56) References Cited

U.S. PATENT DOCUMENTS

| | | | |
|---|---|---|---|
| 2,998,646 A | 9/1961 | Hitz | |
| 4,581,300 A * | 4/1986 | Hoppin, III ............ | B23K 20/00 228/175 |

(Continued)

FOREIGN PATENT DOCUMENTS

| | | |
|---|---|---|
| EP | 0 720 879 A2 | 7/1996 |
| GB | 2 063 721 A | 6/1981 |

(Continued)

OTHER PUBLICATIONS

Apr. 29, 2013 Search Report issued in British Application No. GB 1302060.7.

*Primary Examiner* — Samuel M Heinrich
(74) *Attorney, Agent, or Firm* — Oliff PLC

(57) ABSTRACT

A method of forming a bonded assembly (10). The method comprises: providing at least first and second parts (12, 14) of an assembly (10) to be bonded; assembling the first and second parts (12, 14) in a required relative position to define a bond interface region therebetween; sealing part way along an edge (18) of the bond interface region using laser beam welding to define a cavity between the first and second parts (12, 14); in a vacuum environment, sealing the remainder of the edge (20) of the bond interface region using electron beam welding to form a fluid tight seal around the cavity; and applying heat and pressure to an external surface of the cavity to diffusion bond the first and second parts (12, 14) together.

8 Claims, 2 Drawing Sheets

(51) Int. Cl.
  *B32B 15/01* (2006.01)
  *B23K 15/06* (2006.01)
  *B23K 26/20* (2014.01)
  *B23K 20/02* (2006.01)

(56) References Cited

U.S. PATENT DOCUMENTS

| | | |
|---|---|---|
| 4,904,538 A | 2/1990 | Juhas |
| 5,113,583 A | 5/1992 | Jenkel et al. |
| 5,593,085 A | 1/1997 | Tohill et al. |
| 5,826,332 A | 10/1998 | Bichon et al. |
| 6,464,129 B2 | 10/2002 | Stueber et al. |
| 2002/0104875 A1 | 8/2002 | Stueber et al. |
| 2002/0153130 A1* | 10/2002 | Okamoto ............ B23K 20/122 165/170 |
| 2003/0029904 A1 | 2/2003 | Pursell |
| 2005/0126664 A1 | 6/2005 | Peterson et al. |
| 2005/0244266 A1 | 11/2005 | Imbourg et al. |
| 2011/0176911 A1 | 7/2011 | Couturier et al. |

FOREIGN PATENT DOCUMENTS

| | | |
|---|---|---|
| GB | 2 257 385 A | 1/1993 |
| JP | A-63-264283 | 11/1988 |

* cited by examiner

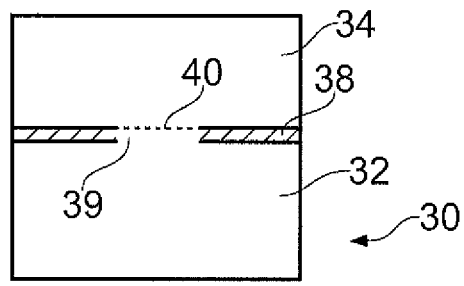
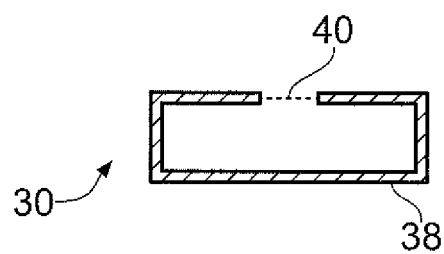
FIG. 2a   FIG. 2b
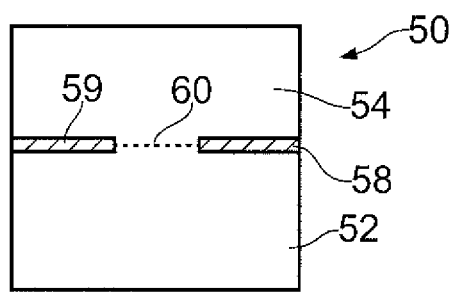
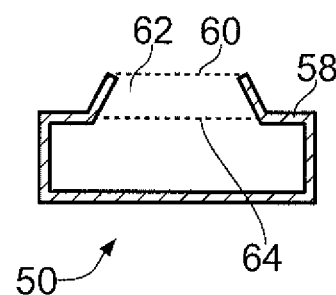
FIG. 3a   FIG. 3b
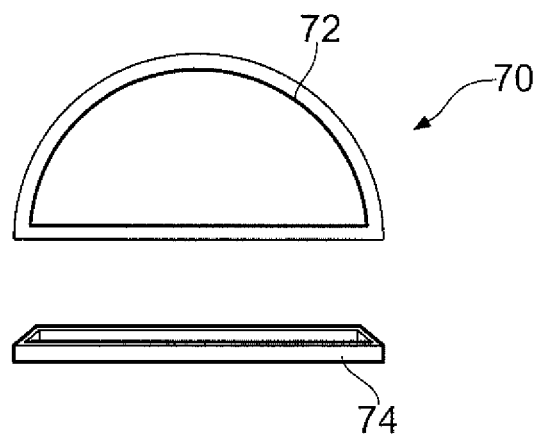
FIG. 4

METHOD OF FORMING A BONDED ASSEMBLY

FIELD OF THE INVENTION

The present invention relates to a method of forming a bonded assembly, and a bonded assembly formed by the method.

BACKGROUND TO THE INVENTION

Conventional methods of manufacture for bonded assemblies such as support structures, casings, discs and drums for gas turbine engines often result in low "fly to buy" ratios (i.e. result in large amounts of wasted material) and require significant amounts of machining to achieve the finished component. Consequently, such conventional methods are expensive both in terms of raw materials and labour. Near net shape manufacture can offer greatly improved fly to buy ratios and large component cost reductions from greatly improved material utilisation rates and reductions in finishing operations such as machining, which may improve factory capacity and throughput.

Hot Isostatic Pressing (HIP) diffusion bonding is one manufacturing method which is suitable for producing high integrity and low cost near net shape components. HIP bonding involves placing powder or one or more part sintered parts into an airtight container and then applying heat and pressure to an external side of the container. The container comprises a malleable metal such as mild steel or stainless steel. One of the main factors affecting the efficacy and cost of this process is the use of the container. The integrity of the container is critical to the success of the HIP diffusion bonding process, since any leaks in the container will allow gas into the powder, which will therefore fail to consolidate to form a bonded component. The complexity of the canister is one of the factors that limit the application of HIP diffusion bonding, since for complex assemblies an extremely complex and potentially costly container would be required. In addition the container material is too weak to support the assembly at the high temperatures required for HIP, and therefore additional tooling would be required to maintain the dimensional conformance of the assembly during sintering. In some case, due to the high temperatures required, the tooling may comprise expensive refractory metals or ceramics.

Consequently, it is desirable to avoid the use of the container in HIP diffusion bonding.

U.S. Pat. No. 5,593,085 discloses one prior method of diffusion bonding in which part sintered components are used to form a container surrounding a cavity. The cavity is evacuated, sealed, and heat and pressure are then applied to the components to collapse the cavity, and thereby bond the components together. However, in order to evacuate the cavity, a sealing tube is required, which must itself be inserted, crimped and sealed prior to evacuation of the cavity. This method therefore requires additional process steps, and is therefore relatively slow and expensive.

GB 2257385 discloses a further prior method of diffusion bonding. First and second components are abutted against one another to form a cavity therebetween. The cavity is then partly sealed using tungsten inert gas (TIG) welding, and the cavity is then evacuated. The cavity is then completely sealed under vacuum using electron beam welding. Heat and pressure are then applied to the external surface of the cavity to thereby collapse the cavity and form a diffusion bonded article. However, such an arrangement is not suitable for components having complex geometries, since TIG welding requires the welding to be conducted in an inert gas atmosphere, such as an argon gas atmosphere.

The present invention describes a method of forming a bonded assembly and a bonded assembly formed by the method which seeks to overcome some or all of the above problems.

SUMMARY OF THE INVENTION

According to a first aspect of the present invention, there is provided a method of forming a bonded assembly, the method comprising:
 providing at least first and second parts of an assembly to be bonded;
 assembling the first and second parts in a required relative position to define a bond interface region therebetween;
 sealing part way along an edge of the bond interface region using laser beam welding to define a cavity between the first and second parts;
 in a vacuum environment, sealing the remainder of the edge of the bond interface region using electron beam welding to form a fluid tight seal around the cavity; and
 applying heat and pressure to an external surface of the cavity to diffusion bond the first and second parts together.

Advantageously, the invention provides a method of bonding an assembly which provides a strong join between the first and second parts without the requirement for a HIP canister. The use of laser beam welding enables first and second parts having complex geometries to be bonded together, since the laser beam welding tool can be manoeuvred around the first and second parts to form a weld bead having a complex shape. Furthermore, the use of laser welding for at least some of the bond interface region results in a low penetration weld, and a small heat affected zone, thereby resulting in a high strength weld. The laser welding method may form an assembly strong enough to support the first and second parts during the application of heat and pressure to diffusion bond the parts together, thereby precluding the need for tools for supporting the assembly.

The cavity may be evacuated to form the vacuum environment prior to either the laser beam welding or the electron beam welding step.

One or both of the laser welding and the electron beam welding may comprise adding weld filler material to the edge of the bond interface region.

One or both of the first and second parts may comprise a non-porous material such as metal or metal alloy, or metal matrix composites. The metal may comprise titanium, titanium alloy, nickel or nickel alloy. The first and second parts may comprise different materials. Alternatively or in addition, the first and second parts may comprise metals having different grain sizes.

One or both of the first and second parts may comprise a sacrificial tab which is provided at the edge of the bond interface region when the first and second parts are assembled.

The method may comprise removing the tab subsequent to the application of heat and pressure to form the assembly.

Advantageously, the tab positions the electron beam weld away from a final geometry of the bonded assembly, thereby ensuring the final geometry of the bonded assembly does not contain any heat affected zones produced by the electron beam welding process. Since the electron beam welding is only used to seal part of the edge of the bond interface region, a relatively small tab can be provided, and hence only a relatively small amount of material needs to be removed subsequent to the bonding step to form the final component. Consequently, the method produces relatively little waste, and requires relatively little machining time, whilst providing a component having substantially no heat affected zone. The tab also provides a run-in and run-out zone for the electron beam weld, thereby ensuring a continuous seal around the edge of the bond interface region.

According to a second aspect of the present invention there is provided a bonded assembly formed by the method of the first aspect of the invention.

BRIEF DESCRIPTION OF THE DRAWINGS

FIG. 2a shows a plan view of a second assembly;

FIG. 2b shows a cross section of the assembly of FIG. 2a through the line A-A;

FIG. 3a shows a similar view to FIG. 2a, but of a third assembly;

FIG. 3b shows a cross section of the assembly of FIG. 3a through the line B-B; and FIG. 4 shows a cross section of a fourth assembly.

DETAILED DESCRIPTION

Figure 1A:
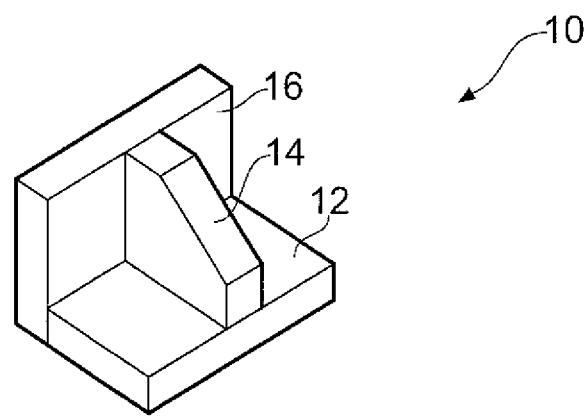
FIGS. 1a to 1c show perspective views of a first assembly in first, second and third stages of assembly.

FIG. 1 shows an assembly 10 comprising first 12, second 14 and third 16 parts. The invention could also be used to bond assemblies comprising fewer or greater numbers of parts. The parts 12, 14, 16 could comprise any suitable metal that can be welded, provided the material is substantially non-porous, or has at least a non-porous outer surface, such that gases cannot penetrate the surface of the parts 12, 14, 16 during a HIP process. In the described embodiments, the parts 12, 14, 16 comprise titanium alloy.

Figure 1B:
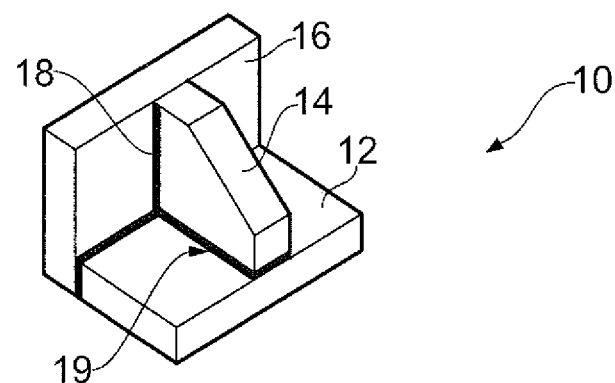

In a first step, shown in FIG. 1a, the first, second and third parts 12, 14, 16 are abutted together in a required relative position. The parts 12, 14, 16 may be clamped together suing any suitable means such as a jig or fixture. Once abutted together, the parts 12, 14, 16 define a bond interface region therebetween at the surface of the parts 12, 14, 16 where the parts abut. Once the assembly is bonded, the bond interface region forms a diffusion bond between the parts 12, 14, 16. The edge of the bond interface region defines a first weld region, shown as line 18 in FIG. 1b, and a second weld region, shown as line 20 in FIG. 1c. The weld region 18 also extends around the underside of the part 14 as viewed in FIG. 1a, and the far side of the part 16, such that the weld regions 18, 20 extend around the whole of the assembly 10 to form a continuous line. The location of the second weld region 20 is chosen to be easily accessible for an electron beam welding process. In a second step, as shown in FIG. 1b, the first weld region 18 is welded using a laser beam welding method. In the laser beam welding method, a laser beam is transmitted to the second weld region 20, which is then heated and melted, forming a weld bead. The laser beam can be provided by any suitable laser, such as a solid state Nd:YAG laser. By welding the first weld region 18, a part seal is formed along the first weld region 18, as shown in part in FIG. 1b. The laser beam welding method provides a high strength bond, but which is low penetration, and provides only a small heat affected zone. A cavity 19 is defined by the sealed weld region 18 due to a small gap between the abutted parts 12, 14, 16. The gap is typically between 300 and 1000 microns (μm) in width. The cavity 19 is continuous, such that gas can flow from any part of the cavity 19 toward the second weld region 20. The cavity 19 is however open at the second weld region 20 after the first weld region 18 has been sealed.

Once the first weld region 18 is sealed, the assembly 10 is placed in a vacuum environment. Since laser beam welding can be conducted in air at a room pressure environment, the laser beam welding step may be carried out before the assembly 10 is placed in the vacuum environment. Alternatively, the laser beam welding could be carried out in the vacuum environment.

Figure 1C:
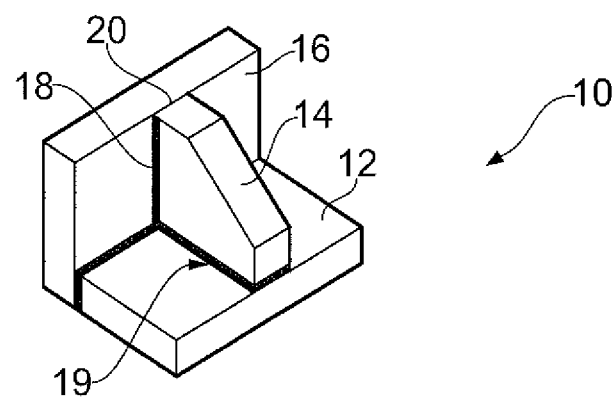

Once the assembly 10 is in the vacuum environment, the second weld region 20 is sealed using an electron beam welding method, as shown in FIG. 1c. In practice, the weld regions 18, 20 may overlap somewhat to ensure that no gap is provided between the regions 18, 20. In the electron beam welding step, a beam of high velocity electrons is applied to the second weld region 20. The parts 12, 14 at the second weld region 20 thereby melts, as the kinetic energy of the electrons is transformed into heat upon impact. In some cases, a filler metal may be applied to the weld region 20 to provide additional material to fill the weld region 20 to ensure a gas tight seal, as is well known in the art. In order for the electron beam welding step to be successful, the electron beam welding must be carried out in a low pressure or vacuum environment having a pressure of less than 0.2 millibar (20 pascals). The low pressure environment also ensures that the gap 19 is evacuated to a sufficient degree to allow the gap 19 to collapse when heat and pressure is applied externally to form a diffusion bond. The electron beam welding step has also been found to heat the component locally, thereby allowing dissipation of moisture from the gap, and consequently resulting in an improved diffusion bond.

Once the electron beam welding step has been carried out, a seal is thereby provided around all of the weld regions 18, 20, thereby creating an airtight seal around the cavity 19. Since the electron beam welding step is carried out in a vacuum environment, the cavity 19 also comprises a vacuum.

Once the seal has been formed around the cavity 19, the welded assembly 10 is then subject to high temperatures and pressures around the external side of the assembly 10 in a HIP process. The HIP process collapses the cavity, and thereby forms a diffusion bond between the parts 12, 14, 16. Due to the strength of the welds provided along the first and second weld regions 18, 20, the assembly 10 may not require any external support to maintain the shape of the assembly 10 during the HIP process. Due to the seal around the cavity 19, and the non-porosity of the parts 12, 14, 16, no container is required for the HIP process. Consequently, the process is relatively quick and inexpensive, and does not require additional machining steps to remove the canister after the HIP process is completed.

FIGS. 2a and 2b show a plan view and a view through the line A-A respectively of a second assembly 30. The assembly 30 is similar to the assembly 10, but comprises only first and second parts 32, 34.

The parts 32, 34 are assembled together in a required relative position as shown in FIG. 2a, and held together by suitable clamps, thereby defining a bond interface region therebetween. A first weld region 38 is then welded by a laser welding method similar to that described in relation to the first embodiment. The first weld region 38 extends around almost the whole circumference of the bond region between the first and second parts 32, 34, as shown more clearly in FIG. 2b. The first weld region 38 defines a gap 39 between the first and second parts 32, 34 which is part sealed by the laser weld. Once the first weld region 38 is welded, a second weld region 40 is then welded by an electron beam welding method under vacuum, similar to that described in relation to the first embodiment. Once the first and second weld regions 38, 40 are welded, the gap 39 is closed. The assembly 30 is then subjected to a HIP process to diffusion bond the parts 32, 34 together.

FIGS. 3a and 3b show a slightly modified bonding method for an assembly 50 comprising first and second parts 52, 54.

The method is similar to the first bonding method, and the assembly 50 is similar to the assembly 30, having first and second parts 52, 54. However, a sacrificial tab 62 is provided which protrudes from the parts 52, 54 at an edge of a bond interface region defined by the abutting region of the two parts 52, 54. In a first step, the first and second parts 52, 54 are bonded at a weld interface region 58 using a laser beam welding method, similar to that of the first and second embodiments, to form a cavity 59 between the first and second parts 52, 54. The tab 62 extends beyond the desired final geometry of the assembly 50 defined by the dotted line 64. The tab 62 defines a second weld region 60, which is to be bonded using an electron beam welding method. Again, the second weld region 60 is chosen at a location which is easily accessible by an electron beam welding apparatus (not shown).

Once the first weld region 58 is bonded, the assembly 50 is placed in a vacuum environment, and the second weld region 40 is bonded using an electron beam welding method to seal the cavity 59. Once the cavity 59 is sealed, the assembly 50 is subjected to a HIP process to bond the parts 52, 54 together.

Once the assembly is diffusion bonded by the HIP process, the tab 62 is removed by a suitable machining process along the line 64 such that the assembly 50 comprises the desired final geometry. By removing the tab 62, the heat affected zone created by the electron beam welding process is also removed, thereby ensuring the strength of the bonded assembly 10. As a further advantage, the method enables a high fly to buy ratio, since only a small area is bonded by the electron beam welding process, and so only a small area needs to be machined subsequent to the HIP process. Since the tab 62 is formed at a region which is easily accessible by an electron beam welding apparatus, the tab 62 is also easily accessible for subsequent machining.

As well as forming bonded assemblies formed from parts of similar materials, the method described herein is also suitable for forming bonded assemblies formed from parts of different materials, or materials having a different grain structure.

For example, FIG. 4 shows an assembly 70 comprising first and second parts 72, 74. The first part 72 comprises a component which is expected to undergo high wear in use, such as a rotating part or a seal of a gas turbine engine. The first part is made of any suitable material, such as non-porous titanium alloy. The second part 74 comprises a highly wear resistant material such as a different titanium alloy having a dispersion of titanium diboride particles, a titanium metal matrix composite (TiMMC), or multiple layers surface comprising titanium-nitrides and titanium-aluminides. When assembled, the second part 74 forms a cladding to protect the first part 72 from wear in use.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For example, the first and second parts could comprise dissimilar metals, such as different titanium alloys or metals having different grain sizes.

The invention claimed is:

1. A method of forming a bonded assembly, the method comprising:
    providing at least first and second parts of an assembly to be bonded;
    assembling the first and second parts in a required relative position to define a bond interface region therebetween;
    sealing part way along an edge of the bond interface region using laser beam welding to define a cavity between the first and second parts;
    in a vacuum environment, sealing the remainder of the edge of the bond interface region using electron beam welding to form a fluid tight seal around the cavity; and
    applying heat and pressure to an external surface of the cavity to diffusion bond the first and second parts together.

2. A method according to claim 1, wherein the cavity is evacuated to form the vacuum environment prior to either the laser beam welding or the electron beam welding step.

3. A method according to claim 1, wherein one or both of the laser welding and the electron beam welding comprises adding weld filler material to the edge of the bond interface region.

4. A method according to claim 1, wherein one or both of the first and second parts comprises a non-porous material.

5. A method according to claim 1, wherein the first and second parts comprise different materials.

6. A method according to claim 1, wherein one or both of the first and second parts comprises a sacrificial tab which is provided at the edge of the bond interface region when the first and second parts are assembled.

7. A method according to claim 6, comprising removing the tab subsequent to the application of heat and pressure to form the assembly.

8. A bonded assembly formed by the method of claim 1.

* * * * *